Patented Aug. 17, 1943

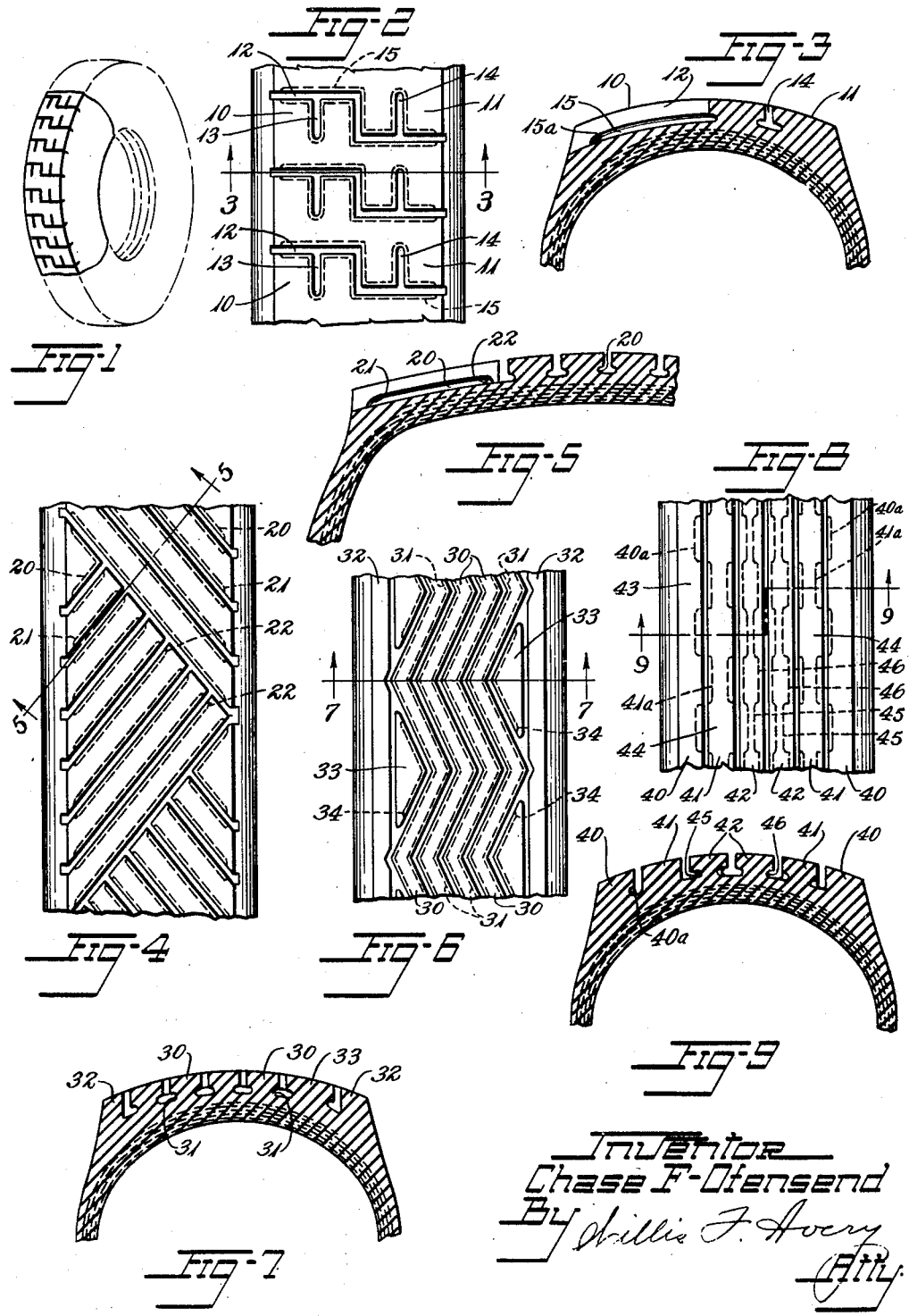

2,327,057

UNITED STATES PATENT OFFICE 2,327,057

TIRE TREAD

Chase F. Ofensend, Akron, Ohio, assignor to The B. F. Goodrich Company, New York, N. Y., a corporation of New York Application May 29, 1941, Serial No. 395,799

9 Claims. (Cl. 152—209)

This invention relates to tire treads, and especially to the treads of pneumatic tires, and is in part a continuation of my co-pending application, Serial No. 291,531, filed August 23, 1939 for a Tire tread, which matured into Patent 2,264,767, December 2, 1941.

It has been proposed heretofore to provide a tread composed of circumferentially extending ribs relatively narrow as compared to their depth so that the resistance to slippage is increased by the tilting of the ribs under the forces on the tire tread tending to cause such slippage. However, owing to the great instability thus provided, control and ease of steering have been objectionably reduced. Upon increasing the widths of such ribs the stability has been increased, but with an accompanying loss of resistance to slippage. Wider, sturdy ribs are desirable for good load support and even wear, but such ribs heretofore have been low in resistance to slippage.

The chief objects of this invention are to provide for overcoming disadvantages in the prior constructions, to provide for an adequate degree of instability of the tread elements for effecting a high degree of resistance to slippage under forces tending to cause slippage, and at the same time to provide tread elements having substantial bodies and broad faces for ground contact and load support, to provide improved cushioning by the tread for increased riding comfort, and to provide related desirable characteristics in the tire tread including quietness of operation, long and even wear, and attractiveness of appearance.

A further object is to provide tread elements having under-cut portions which portions extend less than the full length of the tread elements.

A more specific object is to provide, in tires having elements extending in other than the circumferential direction, tread elements having stable portions and other portions having less stability.

These and further objects will be apparent from the following description reference being had to the accompanying drawing, in which:

Fig. 1 is a perspective view of a tire constructed according to and embodying the invention.

Fig. 2 is a plan view, with parts broken away, of a tread construction.

Fig. 3 is a section taken along the line 3—3 of Fig. 2.

Fig. 4 is a view like Fig. 2 but showing a modified tread construction.

Fig. 5 is a section taken along the line 5—5 of Fig. 4.

Fig. 6 is a view like Fig. 2, but showing a further modified tread construction.

Fig. 7 is a section taken along the line 7—7 of Fig. 6.

Fig. 8 is a view like Fig. 2, but showing a still further modified tread construction.

Fig. 9 is a section taken along the line 9—9 of Fig. 8.

In the attainment of the objects of the invention in the embodiment of Figs. 1 to 3, I provide a tire, indicated generally in Fig. 1, having a tire tread comprising ribs extending predominantly across the tread, each wide throughout a considerable portion of its depth for maintaining a tread face of substantial area throughout an extensive period of wear and a tread body of considerable mass for supporting and transmitting loads, in which tread at least some of the grooves extend in undercut relation into the sides of the ribs well below the tread face. This construction has the advantage that effective load-transmitting bodies of the tread material are provided with wide ground contacting faces that remain wide throughout extensive wear, so that, under normal conditions and under slight accelerative and de-accelerative and side stresses on the tire, the tread has a high degree of stability and resistance to wear, and under forces tending to cause slippage of the tire on the pavement, they are sufficiently unstable by virtue of the undercut construction to permit tilting of the tread portion between grooves to a degree sufficient for more effective action of the tread to resist such slippage.

Also, this undercut construction greatly increases the cushioning qualities of the tread and tire makes it possible to maintain higher inflation pressure in the tire while maintaining a comfortable softness of ride.

In some cases it is desirable in a tread construction incorporating grooved portions to terminate the undercut portions of the grooves in the tread short of the tread margins thereby providing an adequate degree of stability and preventing uneven wear at the free margins of the tread. Also, in a tire tread construction including ribs terminating intermediate the tread margins, it is sometimes advantageous for similar reasons to terminate the undercutting of such ribs short of the ends thereof.

Features of the invention are applicable to tread elements of various forms. For example, in Figs. 1 to 3 the invention is applied to ribs extending predominantly across the tread at right angles thereto. In order to provide edges also in the longitudinal direction, to increase the effectiveness of a tread in resistance of side slippage, each rib may be formed with a jog centrally of the tread to provide rib portions 10, 10 at one side of the tread 11, 11 at the other side of the tread offset and interconnected as shown in Fig. 2, the tread elements being separated by jogged transverse grooves 12, 12. The tread elements may be further broken by short longitudinal extending grooves 13, 13 and 14, 14. The grooves 12, 12 separate the ribs 10, 10, and these grooves are of such cross sectional shape as to provide walls for the ribs that extend substantially radially into the tread for a considerable distance to provide the desired mass of the rib and a uniform width for a substantial depth so that as the tread wears down its characteristics will remain substantially the same for an extensive period.

At the bottoms of the walls of the grooves 12, 12 they extend in undercut relation into the sidewalls of the ribs 10, 10, as indicated at 15, 15, so that upon the application of sufficient force to the tire the ribs will tilt about their regions at the undercut portions at the bottoms of the grooves. Upon distortion by the application of a force on a tire the ribs tilt quite easily to increase resistance to slippage through augmenting of their edge-action. Thus, the tire tread is at once desirably stable under normal conditions and at the same time has the apparently anomalous characteristic of being highly effective to resist slippage under strong forces tending to cause such slippage. The dotted lines in Fig. 2 indicate the preferred extent of undercutting to reduce the stability of the ribs under forces tending to cause tilting thereof.

While it is preferred to proportion the dimensions of the ribs and grooves approximately as shown in the drawing, variations may be made in the degree of undercutting and in the tread pattern and dimensions of the ribs and grooves over a considerable range according to the amount of stability or instability desired, the construction making it possible to combine load-supporting stability and slippage-resisting instability in various degrees in any tire tread comprising ribs and grooves as desired.

Where the grooves are extended to the side edges of the tread to facilitate drainage it is desirable that the ribs at side margins of the tread be reinforced so that uneven wear will not result at such free margins. To this end, according to the invention, the undercut portion of the groove may be terminated short of the tread margins as is shown by the dotted lines in Fig. 2 and at 15a in Fig. 3. In this manner, the ends of the ribs at the tread margins have greater stiffness, while the central portions of the ribs possess the characteristic of reduced stability under tilting stresses.

The invention may be applied also to a tread having long reaches of diagonally disposed ribs, for example as is shown in Figs. 4 and 5. Here, it is desirable to terminate the undercut portion 20, 20 of the grooves short of the tread margin as at 21, 21 and also to terminate such undercut portion short of the ends of the bars intermediate the tread as at 22, 22 in order that the end portions of the ribs may maintain an adequate degree of stability, while at the same time the intermediate portions of the ribs have the desired instability under tilting forces.

With reference to Fig. 6 and Fig. 7, the invention is applicable also to treads in which the ribs are continuous in a zig-zag or sinuous fashion as shown 30, 30. Each rib may be undercut in accordance with the invention as is indicated by the continuous dotted lines 31, 31. Circumferentially continuous marginal ribs 32, 32 may be provided and between these ribs the sinuous ribs triangular blocks 33, 33 may be inserted. While the undercut feature hereinabove described may be incorporated in all the ribs, for the purpose of increasing stiffness at the tread margins, the undercutting may be omitted in the marginal ribs 32, 32 and in the adjacent side of the blocks 33, 33. Both sides of the sinuous ribs 30, 30, preferably are undercut, as is also the adjacent sides of the blocks 33, 33, the undercuts terminating at 34, 34 as indicated by the broken lines in Fig. 6.

The undercutting of a rib may be discontinuous in the extent of the rib to provide alternating portions of high load-carrying stability and portions of relative instability for response to skidding forces. In the embodiment of Figs. 8 and 9 of the drawing a plurality of circumferential ribs 40, 40, 41, 41, 42, 42, are shown having portions undercut, as indicated 40a, 41a, 42a. Other and alternating portions of the same ribs may be of substantially the same width for the extent of their depth to provide for load-supporting stability as at 43, 43, 44, 44 in the side ribs 40, 40 and 41, 41. Where desired, the ribs may be undercut continuously but varied in the depth of the undercutting, as for example as is shown in the two center ribs 42, 42 where relatively deep undercut portions 45, 45 alternate but merge with relatively shallow undercut portions 46, 46.

The portions having slippage-resistant instability permit a tendency to tilt and provide for more effective traction of the tread on a surface. The relatively unstable undercut portions may be in line laterally as between adjacent ribs or such portions may be staggered, if desired, for considerations of quietness and wear, or such portions may be otherwise suitably disposed in relation to each other. In the embodiment of Figs. 8 and 9 the arrangement provides gradually increasing amount of undercutting, and therefore increasing instability, toward the center of the tread from the margins thereof, although other arrangements may be provided, as desired.

Discontinuity in varying widths of undercutting may be applied advantageously to rib constructions of any tread pattern as desired. Distortion of the unstable rib portions under forces tending to cause skidding will result to resist such slippage by the edge-action of the ribs augmented by the facility of portions of the ribs to tilt, while the stable portions of the ribs support the weight and resist over-tilting of the ribs and maintain stability of the tire, and also quiet operation and good wear are promoted.

Variations may be made without departing from the scope of the invention as it is defined in the following claims.

I claim:

1. A tire having a tread comprising a plurality of tread elements of uniform width at the tread surface separated at the tread surface by grooves of uniform width at least some of which extend in undercut relation into the sides of the elements to provide lesser width of the elements at the undercut portions thereof than at their faces, the undercut portions terminating short of the extent of such elements.

2. A tire having a tread comprising a plurality of discontinuous ribs in the face of the tread, said ribs being separated by grooves extending in undercut relation into the sides of the ribs, said undercut portions of the grooves terminating short of the ends of the ribs.

3. A tire having a tread comprising a tread element separated from an adjacent tread area at the tread surface by a groove of uniform width, said element having a relatively stable portion of substantially the same width for the extent of its depth, and a portion having the same width at the tread surface of the tire as said first-named portion into which the groove extends in undercut relation providing a relatively unstable portion.

4. A tire having a tread comprising a tread element separated at the tread surface from an adjacent tread area by a groove of uniform width, said element having portions into which the groove extends in undercut relation to a relatively slight extent providing relatively stable portions, and portions into which the groove also extends in undercut relation but to a relatively greater extent providing relatively unstable portions.

5. A tire having a tread comprising a plurality of circumferentially continuous ribs of uniform width at the tread surface separated at the tread surface by grooves of uniform width, portions of at least some of which grooves extend in undercut relation into the sides of the ribs at spaced-apart positions along the same in a manner to provide lesser width of the elements at the undercut portions than at the faces and to provide alternating relatively unstable portions of the ribs while intervening portions remain relatively stable.

6. A tire having a tread comprising a plurality of circumferentially continuous ribs of uniform width at the tread surface separated at the tread surface by grooves of uniform width, said ribs having relatively stable spaced-apart portions of substantially the same width for the extent of their depth, and intervening portions into which the grooves extend in undercut relation providing relatively unstable portions.

7. A tire having a tread comprising a plurality of circumferentially continuous ribs separated at the tread surface by grooves of uniform width, said ribs having spaced-apart portions into which the grooves extend in undercut relation to a relatively slight extent providing relatively stable portions, and intervening portions into which the grooves also extend in undercut relation but to a relatively greater extent providing relatively unstable portions.

8. A tire having a tread comprising a tread element separated at the tread surface from an adjacent tread area by a groove of uniform width, said element having a relatively stable portion and an adjacent relatively unstable portion, said relatively unstable portion being provided by an undercut relation of said groove in the side of the element throughout the portion in a manner to provide lesser width of the element at such portion than at the adjacent portion.

9. A tire having a tread as defined in claim 8 in which the groove extends in undercut relation in both said portions of the element but to a relatively greater extent in said relatively unstable portion.

CHASE F. OFENSEND.